Aug. 3, 1943.                     H. H. COOK                    2,325,833
                                   LOADER
                             Filed Feb. 2, 1942            2 Sheets-Sheet 1
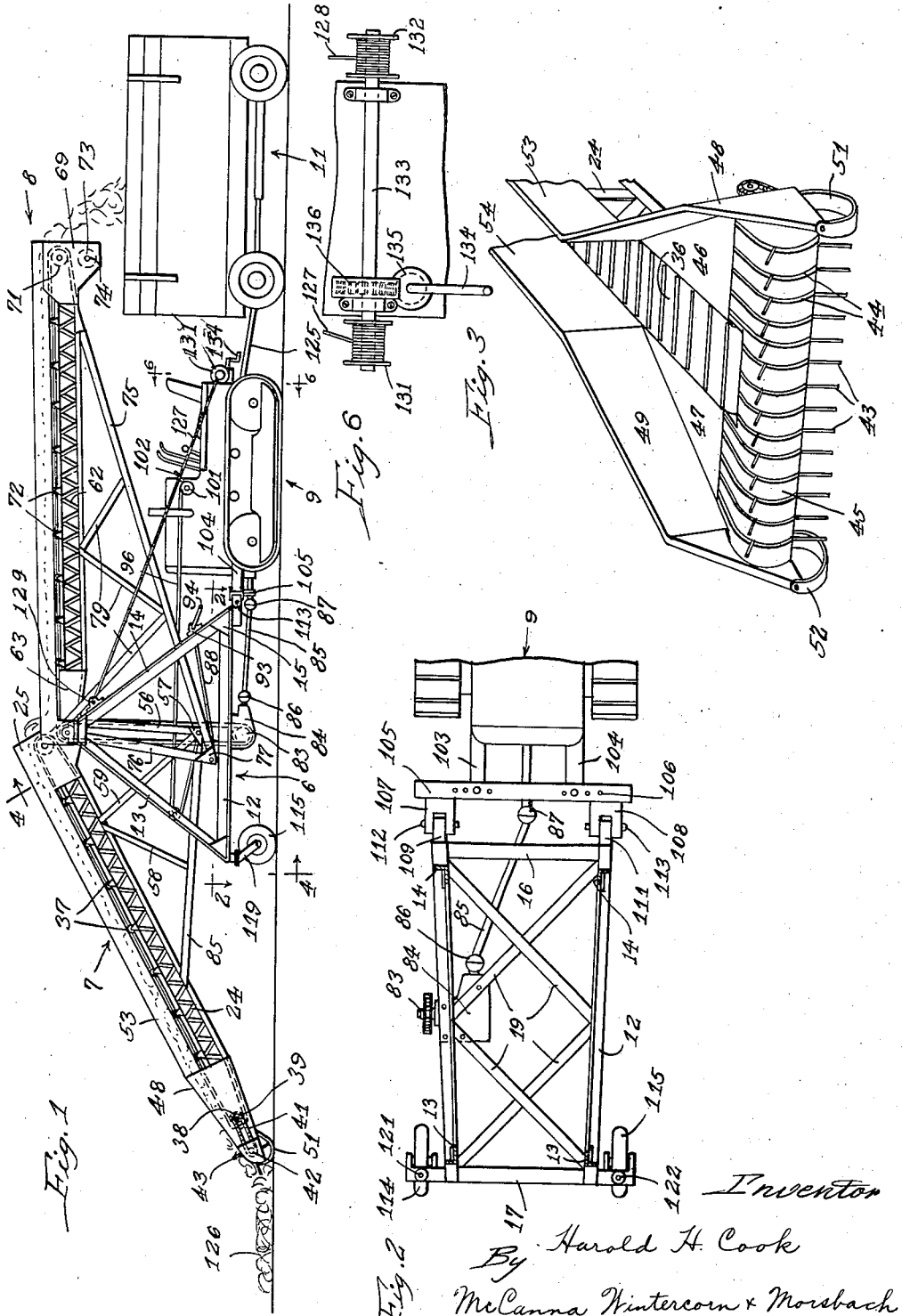
Inventor
Harold H. Cook
By McCanna, Wintercorn & Morsbach
Attys.

Aug. 3, 1943.   H. H. COOK   2,325,833
LOADER
Filed Feb. 2, 1942   2 Sheets-Sheet 2
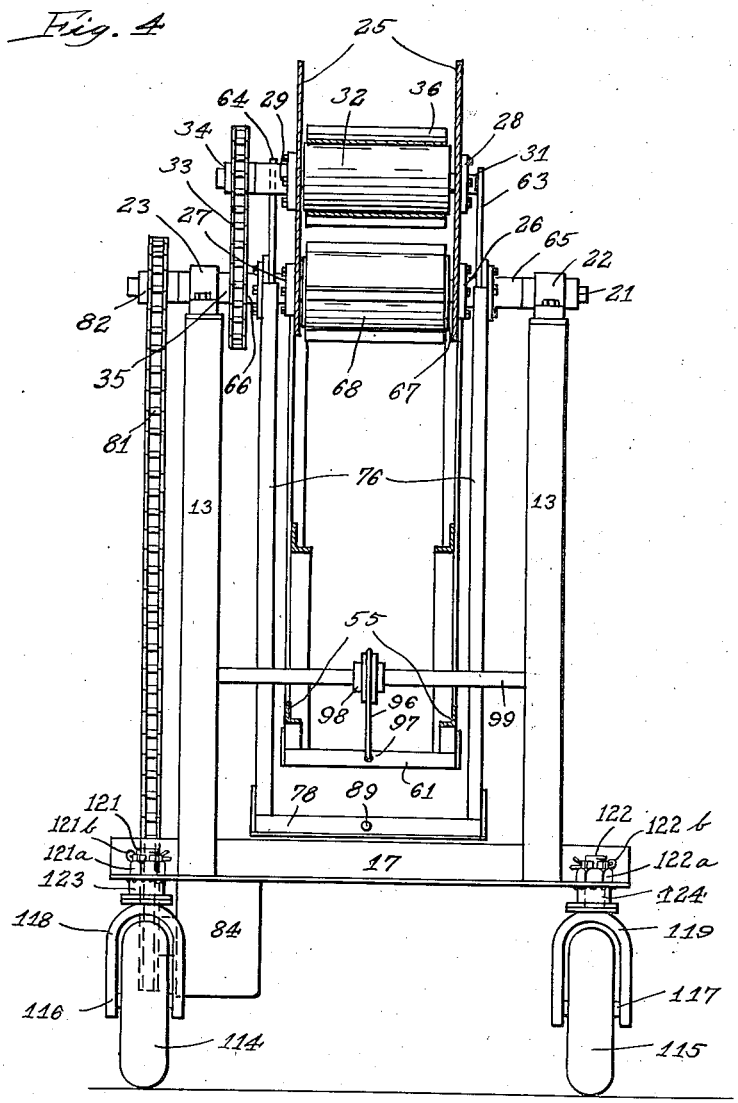
Inventor:
Harold H. Cook
By
McCanna, Wintercorn & Morsbach
Attys.

Patented Aug. 3, 1943

2,325,833

UNITED STATES PATENT OFFICE 2,325,833

LOADER

Harold H. Cook, Steward, Ill.

Application February 2, 1942, Serial No. 429,271

10 Claims. (Cl. 198—233)

This invention relates to loading devices, and has special reference to a device for gathering and loading vine-like agricultural crops, such, for example, as peas, beans and the like, though also suitable for loading other analogous materials.

In the harvesting of peas, beans and the like for canning purposes it is necessary to cut the vines, rake the same into formations suitable for handling, then to load the vines into wagons or other conveyances by which they are transported to equipment for removing the peas or beans from the vines, such equipment commonly being called viners. This whole operation is a laborious one for one reason, because of the difficulty of handling the vines by means of forks, since the vines are badly tangled and this situation is aggravated by the mechanical operations of handling the same, which further entangle the vines and make the load very difficult to remove from the conveyance. Thus this problem has been a particularly aggravated one in the art through a period of years. Numerous attempts have been made to handle the problem, such, for example, as the use of a conventional hay loading equipment, but these machines have proved unsatisfactory, where the blower types have been used because of damage to the material being handled and where the conventional chain elevator types have been used, because the machine acts to further entangle the vines and aggravate the situation.

An object of the invention is the provision of a generally improved loading device of the character described having a novel form of conveyor mechanism and novel means for mounting the same for movement through the field in a pick-up operation.

Another object of the invention is the provision of a loader of the type described wherein the material is transported on a conveyor band arranged in a plurality of sections, and wherein the sections are supported at an elevated point on a frame structure arranged to be propelled in front of a tractor or other automotive device whereby to render the machine highly maneuverable.

Other objects and advantages will appear from the following description and the accompanying drawings, in which—

Figure 1 is a side elevational view of a loader embodying my invention;

Fig. 2 is a view partly in section taken on the line 2—2 of Figure 1;

Fig. 3 is a perspective view of the pick-up device;

Fig. 4 is a view taken substantially along the line 4—4 of Figure 1, partly in section;

Fig. 5 is a fragmentary side elevation of the supporting frame showing the drum for adjusting the rear conveyer section, and Fig. 6 is a view taken on the line 6—6 of Figure 1.

The embodiment of the invention herein shown includes a supporting frame designated generally by the numeral 6, a forward conveyer section 7, a rear conveyer section 8, an automotive device 9, and a truck or other vehicle 11. The supporting frame 6 is formed of two spaced triangular upright members formed of L section steel beams, each section comprising a lower beam 12, and side beams 13 and 14 extending from the ends of the lower beam 12 to an elevated point at which the side beams meet to form a triangle. Suitably the corners of the triangles are reinforced by means of plates as indicated at 15. The lower beams 12 are interconnected by transverse beams 16 and 17 and by bracing members 19 to form a rigid base interconnecting the two sides. The apex of the triangles are connected by a transverse shaft 21 (Fig. 4) carried in bearings 22 and 23 at the top of the sides to thus form a rigid supporting frame.

The sections 7 and 8 are pivotally supported on the cross shaft 21 and are similarly constructed with respect to the type of beams and frame structure. The conveyer section 7 includes a beam comprising a truss 24 attached to structural steel plates 25 positioned at one end thereof and disposed at opposite sides of the truss which function to support the truss on the shaft 21. The plates 25 carry bearings 26 and 27 positioned on the shaft 21 so that the beam is rotatable or swingable about the shaft for the purpose of adjusting its angular position. Carried on the plates 25 are bearings 28 and 29 which carry a shaft 31 upon which is disposed a drum 32, the shaft and drum being driven from the shaft 21 by means of a chain 33 and sprockets 34 and 35 on the shafts 31 and 21, respectively. A conveyer band 36 of conventional form is trained over the drum 32 and extends longitudinally of the beam, the upper reach thereof being carried on supporting rollers 37 spaced longitudinally of the beam. The band 36 is endless and at the opposite end of the truss 24 is trained over a second drum 38 similar to the drum 32 carried on a shaft 39, which shaft is driven by the band. The shaft carries a sprocket driving a chain 41 which serves to drive a pick-up device best shown in Fig. 3. This pick-up device, which in essence is of conventional form, includes a transverse shaft 42 upon which are disposed a plurality of rows of wire fingers 43, which fingers pass through slots 44 in a guard 45 extending longitudinally of the shaft 42 and transversely of the conveyer band 36. Disposed rearwardly of the guard 45 and on opposite sides of the conveyer band 36 are stationary aprons 46 and 47 having upstanding side walls 48 and 49 on opposite sides thereof to guide the material gathered up by the fingers 43 onto the band 36, the upstanding side walls serving to confine the flow of material. Runners 51 and 52 or other suitable guide means are provided on the lower side of the pick-up device to protect the fingers 43 and prevent the end of the conveyer section from being driven into the ground by tilting movement occasioned by irregularities in the ground. Where desired the side walls 48 and 49 may be continued throughout the length of the section, as indicated at 53 and 54. The section 7 has depending brace members preferably formed of structural steel such as suitable angle iron to form with the truss 24 a triangular frame structure. These members are braced by intermediate bracing members 58 and 59 to further rigidify the structure. The laterally spaced frame members 55 and 56 are interconnected at the junction 57 by a connecting bar 61 (Fig. 4).

The rear section 8 likewise includes in this instance a beam comprising a truss 62 having structural plates 63 and 64 at its ends adjacent the shaft 21 carrying bearings 65 and 66 disposed on the shaft 21 for pivotal adjustment of the section thereon, the shaft having a drum 67 disposed on the shaft and over which is trained a conveyer band 68. The opposite end of the truss likewise carries opposed structural plates 69 between which is carried a drum 71 similar to the drum 68 over which the conveyer band is trained in a continuous fashion, the conveyer band being supported intermediate the drums by rollers 72 spaced along the length of the beam. The structural plates 69 also have a shaft 73 disposed below the drum 71 carrying a drum 74 and arranged for the pivotal support of an additional conveyer section where such section may be desirable, in accordance with the teachings of my copending application Serial No. 304,479, filed November 15, 1939, the present device being a species of the generic invention therein shown and claimed. The conveyer section 8, like section 7, has laterally spaced frame members 75 and laterally spaced frame members 76 connected together as indicated at 77 and having a cross-member 78 interconnecting the spaced sides of the frame, the frame structure being provided with intermediate bracing members 79 to impart further rigidity to the conveyer frame section.

The conveyer bands of the two sections and the pickup device are driven from the shaft 21, which in turn is driven by a chain 81 trained over a sprocket 82 on the shaft 21 and over a sprocket 83 carried on a gear unit 84 attached to the base of the supporting frame, the gear unit 84 being connected by a torque tube 85 and universal joints 86 and 87 to the power take-off shaft of the automotive unit 9 by detachable means such as now well known in the art, as, for example, a splined connection.

As will be seen from Figs. 1 and 4, the conveyer sections 7 and 8 are angularly adjustable about the shaft 21 so that these sections may be placed in a plurality of inclined positions for rapid highway transit or other analogous purposes. For example, the section 7 may be moved between a substantial horizontal position and the working position shown in Figure 1, whereas the section 8 may be adjusted to different angularities to convey the material to the desired point. This adjustment of angularity of the section 8 is accomplished by means of a cable rope or the like 88 attached to the center portion of the connecting member 78 as shown at 89 and wound on a drum 91 as shown in Fig. 5 carried on a shaft 92 disposed in bearings 93 on the beams 14 as shown in Fig. 5, the shaft being rotatable by a crank 94 to rotate the drum and wind or unwind the cable 88 onto the drum and thus swing the conveyer section as desired, the shaft being retained in position by a ratchet 95. The section 7 is moved between its adjusted position and retained in its working position by means of a cable or rope 96 attached to the cross member 61 as indicated at 97 and trained over a pulley 98 carried on a shaft 99 supported in the opposed beams 13, as best shown in Fig. 4, the cable being trained backward to the automotive unit 9 and over a drum 101 carried thereon and rotatable by a handle 102 in order to wind or unwind the cable on the drum and thus control the angular position of the section 7, the handle 102 being rotatable by the operator of the automotive unit during the movement of the device through the field so as to raise and lower the forward end of the section 7 in accordance with the undulations of the ground.

The automotive unit 9 in this instance comprises a conventional crawler type tractor, though obviously other types of automotive units may be substituted therefor. Attached to the frame or other stationary part of the automotive unit 9 at the front thereof are forwardly disposed beams 103 and 104 arranged to be attached to a transverse beam 105, the beams 103, 104 and 105 being provided with suitable means for attachment to different automotive units, the arrangement in this case being a plurality of holes 106 in the beam 105 to permit the beams 103 and 104 to be bolted to the beam 105 in different spaced relation depending upon the width of the tractor frame. Attached to the forward side of the beam 105 are spaced hinge yokes 107 and 108 to which ears 109 and 111 are pivotally secured by pintles 112 and 113, the ears being fixed on the base of the supporting frame to provide a hinge connection between the supporting frame and the automotive device which permits of relative movement on a horizontal axis only about the pintles 112 and 113. The opposite end of the supporting frame 6 is carried on spaced wheels 114 and 115 carried on spindles 116 and 117 which in turn are supported in forks 118 and 119 having vertically disposed shafts 121 and 122 rotatably carried in bearings 123 and 124 attached to the cross member 17, the wheels, spindles and bearings forming casters for carrying the forward end of the supporting frame. The shafts 121 and 122 are removably held in position by nuts 121a and 122a and by cotter pins 121b and 122b. The opposite end of the supporting frame 6 is also supported by cables 127 and 128 attached to eyelets 129 on each of the side beams 14 and trained over drums 131 and 132 disposed on a rotatable shaft 133 mounted at the rear of the tractor or otherwise suitably positioned on the automotive vehicle, the shaft being rotated from a crank 134 through a worm 135 and worm gear 136 to control the length of cable and thus the elevation of the free end of the frame 6. It will be seen that by loosening the cables the forward end of the frame 6 may be entirely carried on the wheels 115 and 116 and by winding up the cables, the wheels 115 and 116 may be normally carried off the ground so as to contact the ground only in response to unevenness thereof. Both of these modes of operation are contemplated dependant upon the nature of the ground upon which the work is being done. In addition, the wheels 115 and 116 are removably carried upon the frame so that by removing the cotter pins 121b and 122b and nuts 121a and 122a the wheels may be removed from the frame for improved operation under certain ground conditions. Thus I contemplate supporting the forward end of frame 6 on the caster wheels, on the cables, or on both, dependant upon operating conditions.

It will be seen that with this construction the supporting frame is positioned in such relationship as to be pushed ahead of the automotive device and to be maintained in alignment therewith. The beams 103 to 105 and the hinge members connecting the same to the supporting frame are of such strength that as the tractor or other automotive device is turned, the casters are likewise caused to turn when in contact with the ground so as to maintain the supporting frame in line with the tractor, thereby rendering the two maneuverable as a unit.

The wagon 11 is arranged to be towed behind the automotive device by means of a tow bar 125 or by a tongue or other suitable device as is well known in the art, so as to cause the wagon to maintain its position behind the tractor in a position in which the material is delivered thereto from the end of the conveyer section 8, as indicated in Figure 1.

In the use of the device for harvesting purposes, the vine crop is cut in the usual way and raked into windrows as indicated at 126 (Figure 1). The loader is then taken into the field with the parts in the position shown in Figure 1, the pick-up device being so arranged that the vines are engaged by the fingers 43, whereupon the material will be elevated onto the conveyer band 36, thence transferred to the conveyer band 68 from which it is delivered into the wagon 11. Conventionally, a plurality of wagons are employed, so that the loader may operate continuously, the empty wagons being successively substituted for the wagons filled by the operation of the loader. It will be seen that the entire loading operations are within the control of the operator of the tractor including the raising and lowering of the section 7 as may be required. When the loader is not in use the tractor or other source of automotive power can be disconnected from the supporting frame for other use by simply withdrawing the pintles 112 and 113 or by removing the beams 103 and 104 whichever may be desirable and by disconnecting the drive formed by the torque tube 85. An important advantage of this device is the fact that the vines are not further matted or entangled as a result of the loading operations, and as a matter of fact, the method of loading is such as to tend to loosen the vines and to facilitate the unloading thereof from the wagon 11 because the vines are caused to string out along the conveyer bands as the material is picked up and transferred to the wagon. Furthermore, the method of handling is such that the material, such as peas or beans, are not damaged during the process of handling. Another advantage of the construction is the fact that it is light in service and of such rigidity throughout that it can be moved at relatively rapid speed through the field to accomplish the loading operation without occasioning damage to the machine and excessive maintenance costs.

It will be understood that I have herein described a specific embodiment or the invention by way of illustration, and I do not wish to be limited except as required by the scope of the appended claims, in which I claim:

1. The combination in a loader for vine crops and the like of a rigid supporting frame having a base, spaced upstanding side members thereon, and an elevated transverse shaft connecting said side members, an automotive unit positioned at one end of said frame, means for supporting said end of said frame on said unit comprising spaced pivotal connections shaped for relative pivotal movement between said frame and said automotive unit about a horizontal axis only extending transversely of the frame and unit to support the frame thereon to maintain said unit and frame in longitudinal alignment with turning movement of the automotive unit, means for supporting the opposite end of said frame in spaced relation to the ground, a pair of conveyer sections mounted in end to end interfitting relationship on said shaft for angular adjustment of the free ends thereof, each of said sections comprising a rigid triangular frame structure, the bases of which fit below said shaft to provide space below one of said sections for said automotive unit, a pick-up device positioned on the free end of the forward section for picking up vine crops from the ground, conveyer means on said section for conducting said vine crops along said sections and depositing the same at the rearward end thereof, means engaging the frame of said forward section adjacent the low corner thereof and extending to the automotive unit for adjusting the angular position of the forward section and the elevation of said pick-up device, and means for driving said conveyer means and pick-up device from said automotive unit.

2. The combination in a loader for vine crops and the like of a rigid supporting frame having a base, spaced upstanding side members thereon and an elevated transverse shaft connecting said side members, forwardly and rearwardly projecting conveyer sections mounted at their adjacent ends in end to end relationship on said shaft for angular adjustment of the elevation of the free ends thereof, each of said sections including a triangular frame having the bases thereof depending in interfitting relationship below said shaft, an automotive unit positioned at the one end of said frame beneath one of said sections, means for supporting said end of said frame on said unit comprising a transverse beam secured to said unit having hinge members disposed adjacent opposite ends thereof connected to the base of said supporting frame and rotatable about a horizontal transverse axis only to maintain said unit and said supporting frame in longitudinal alignment with turning movement of said unit, means for supporting the opposite end of said frame in spaced relationship with the ground, means for driving said conveyer sections from said automotive unit comprising a power transmission unit attached to said supporting frame for removable engagement with said automotive unit for separation of said supporting frame and said automotive unit and independent use of the latter, a pick-up device positioned on the free end of the forward section for picking up vine crops from the ground and urging the same onto said conveyer, and means for engaging the frame of said forward section adjacent the low corner thereof and extending to the automotive unit for adjusting the angular position of the forward section and the elevation of the pick-up device.

3. The combination in a loader for vine crops and the like of a rigid supporting frame having a horizontally disposed base, spaced upstanding side members thereon and an elevated transverse shaft connecting said side members, a pair of caster wheels disposed at the front of said base in laterally spaced relation for supporting the front of said frame for longitudinal and turning movement thereof, an automotive unit positioned at the rear of said frame, spaced coaxial hinge members acting between the rear end of said frame and the front of said automotive unit for relative angular movement between the frame and the unit on a transverse axis only, said hinge members acting to support the rear end of said frame on said automotive unit and to maintain said frame and said unit in longitudinal alignment with turning movement of said automotive unit, a pair of conveyer sections mounted in end to end relationship on said shaft for angular adjustment with respect to said supporting frame, said sections normally extending longitudinally of said supporting frame, the forwardly disposed section being inclined with its forward end adjacent the ground and the rearward section extending rearwardly over said automotive unit, a pick-up device positioned on the front end of said forward section for picking up vine crops from the ground, a conveyer element in the form of a conveyer band for transporting the material from said pick-up device rearwardly to the end of said rearward section for deposit in a trailing vehicle, and means for driving said conveyer band and said pick-up device from the automotive unit.

4. The combination recited in claim 3 wherein said driving means and said hinge members constitute quick releasable connecting means between said base and said automotive unit for independent use of the latter.

5. The combination in a loader for vine crops and the like of a rigid supporting frame having a horizontally disposed base, spaced upstanding side members thereon and an elevated transverse shaft connecting said side members, an automotive unit positioned at the rear of said frame, spaced coaxial hinge members acting between the rear end of said frame and the front of said automotive unit for relative angular movement between the frame and the unit on a transverse axis only, said hinge members acting to support the rear end of said frame on said automotive unit and to maintain said frame and said unit in longitudinal alignment with turning movement of said automotive unit, means for supporting the front end of said frame in spaced relation to the ground, a pair of conveyer sections mounted in end to end relationship on said shaft for angular adjustment with respect to said supporting frame, said sections normally extending longitudinally of said supporting frame, the forwardly disposed section being inclined with its forward end adjacent the ground and the rearward section extending rearwardly over said automotive unit, a pick-up device positioned on the front end of said forward section for picking up vine crops from the ground, a conveyer element in the form of a conveyer band for transporting the material from said pick-up device rearwardly to the end of said rearward section for deposit in a trailing vehicle, means for driving said conveyer band and said pick-up device from the automotive unit, means acting between the automotive unit and the forward frame section, under the control of the operator of said automotive unit, for angularly adjusting the position of the forward section in response to undulations in the surafce of the ground over which the loader passes, and independent means for adjusting the angularity of the rearwardly disposed section.

6. The combination recited in claim 3 wherein said driving means comprises a power transmission unit disposed on the base of said supporting frame, means for driving said transmission unit from the power take-off of said automotive unit, means for driving said transverse shaft from the power transmission means, and means for driving said conveyer band from said transverse shaft.

7. The combination in a loader for vine crops and the like of a rigid supporting frame having a base, spaced upstanding side members thereon, and an elevated transverse shaft connecting said side members, an automotive unit positioned at one end of said frame, means for supporting said end of said frame on said unit comprising spaced pivotal connections shaped for relative pivotal movement of said frame and said automotive unit about a horizontal axis extending transversely of the frame and unit only to maintain said unit and frame in longitudinal alignment with turning movement of said unit, means for supporting the opposite end of said frame in spaced relation to the ground, a pair of conveyer sections mounted in end to end relationship on said shaft for angular adjustment with respect to said supporting frame, the forwardly disposed one of said sections normally extending longitudinally and angularly toward the ground in its working position and the other section extending over said automotive unit, each of said sections comprising a beam portion, and brace members rigidly secured to the lower side of said beam portion forming therewith a rigid triangular conveyer frame having a long side formed by said beam portion, a short side extending downwardly to a plane adjacent said base and an upwardly sloping long side connecting the end of said short side with said beam portion to provide space below one of said sections for said automotive unit, a pick-up device positioned on the free end of the forward section for picking up vine crops from the ground, conveyer means on said sections for conducting said vine crops along said sections and depositing the same at the rearward end thereof, means engaging the frame of said forward section adjacent the low corner thereof and extending to the automotive unit for adjusting the angular position of the forward section and the elevation of the pick-up device, and means for driving said conveyer band and pick-up device from said automotive unit.

8. The combination in a loader for vine crops and the like of a rigid supporting frame having a base, spaced upstanding side members thereon, and an elevated transverse shaft connecting said side members, an automotive unit positioned at one end of said frame for moving the loader through a field in a pick-up operation, means for supporting said end of said frame on said automotive unit comprising spaced pivotal connections shaped for relative pivotal movement between said frame and said automotive unit about a horizontal axis only, extending transversely of the frame and unit to maintain said unit and frame in longitudinal alignment, means acting between said automotive unit and an elevated point on said frame for supporting the opposite end of said frame in spaced relation to the ground, a pair of conveyer sections mounted in end to end interfitting relationship on said shaft for angular adjustment of the free ends thereof, each of said sections comprising a rigid triangular frame structure, the bases of which fit below said shaft to provide space below one of said sections for said automotive unit, a pick-up device positioned on the free end of the forward section for picking up vine crops from the ground, conveyer means on said section for conducting said vine crops along said sections and depositing the same at the rearward end thereof, means engaging the frame of said forward section adjacent the low corner thereof and extending to the automotive unit for adjusting the angular position of the forward section and the elevation of said pick-up device, and means for driving said conveyer means and pick-up device from said automotive unit.

9. The combination in a loader for vine crops and the like of a rigid supporting frame having a base, spaced upstanding side members thereon, and an elevated transverse shaft connecting said side members, an automotive unit positioned at one end of said frame for moving the loader through a field in a pick-up operation, means for supporting said end of said frame on said unit comprising spaced pivotal connections shaped for relative pivotal movement between said frame and said automotive unit about a horizontal axis only, extending transversely of the frame and unit to maintain said unit and frame in longitudinal alignment, means for supporting the opposite end of said frame in spaced relation to the ground comprising a rotatable drum on said automotive unit and a cable trained thereover and affixed to an elevated point on said frame, a pair of conveyer sections mounted in end to end interfitting relationship and on said shaft for angular adjustment of the free end thereof, each of said sections comprising a rigid triangular frame structure, the bases of which fit below said shaft to provide space below one of said sections for said automotive unit, a pick-up device positioned on the free end of the forward section for picking up vine crops from the ground, conveyer means on said sections for conducting said vine crops along said sections and depositing the same at the rearward end thereof, means engaging the frame of said forward section adjacent the low corner thereof and extending to the automotive unit for adjusting the angular position of the forward section and the elevation of said pick-up device, and means for driving said conveyer means and pick-up device from said automotive unit.

10. The combination in a loader for vine crops and the like of a rigid supporting frame having a horizontally disposed base, spaced upstanding side members thereon and an elevated transverse shaft connecting said side members, an automotive unit positioned at the rear of said frame for moving the loader through a field in a pick-up operation, spaced coaxial hinge members acting between the rear end of said frame and the front of said unit for relative angular movement between the frame and the unit on a transverse axis only, said hinge members acting to support the rear end of said frame on said unit and to maintain said frame and said unit in longitudinal alignment with turning movement of said automotive unit, a rotatable drum positioned on said automotive unit, a cable trained over said drum and connected to an elevated point on said frame for supporting the front end of said frame in spaced relation to the ground, a pair of caster wheels disposed at the front of said base in laterally spaced relation for limiting the approach movement of the front of said base toward the ground and for supporting the front end of said frame, a pair of conveyer sections mounted in end to end relationship on said shaft for angular adjustment with respect to said supporting frame, said sections normally extending longitudinally of said supporting frame, the forwardly disposed section being inclined with its forward end adjacent the ground and the rearward section extending rearwardly over said automotive unit, a pick-up device positioned on the front end of said forward section for picking up vine crops from the ground, a conveyer element in the form of a conveyer band for transporting the material from said pick-up device rearwardly to the end of said rearward section for deposit in a trailing vehicle, and means for driving said conveyer band and said pick-up device from the automotive unit.

HAROLD H. COOK.